Jan. 5, 1932.  J. T. PEARSON ET AL  1,839,254
CONDUIT OUTLET BOX AND GROUNDING DEVICE
Filed March 11, 1926

INVENTORS
John T. Pearson and
BY Raymond H. Olley
Parsons & Bodell
ATTORNEYS.

Patented Jan. 5, 1932

1,839,254

UNITED STATES PATENT OFFICE

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK

CONDUIT OUTLET BOX AND GROUNDING DEVICE

Application filed March 11, 1926. Serial No. 94,015.

This invention relates to grounding devices for grounding electric conduit systems to a water pipe or other grounded conductor, and having a looped strap for mechanically and electrically connecting it to the grounded conductor, and it has for its object particularly simple and efficient means for tightening the strap around the grounded conductor, and securing the strap to the body of the device, and also for contracting the loop of the conductor around the grounded contact so as to engage throughout nearly all but a very small portion of the periphery of the grounded conductor. The device here shown is in the form of an outlet box so that the mechanical connections are housed within the box.

The invention consists in the novel features and in the combinations and constructions hereinafter set forth and claimed.

In describing this invention reference is had to the accompanying drawings in which like characters represent corresponding parts in all the views.

Figure 1:
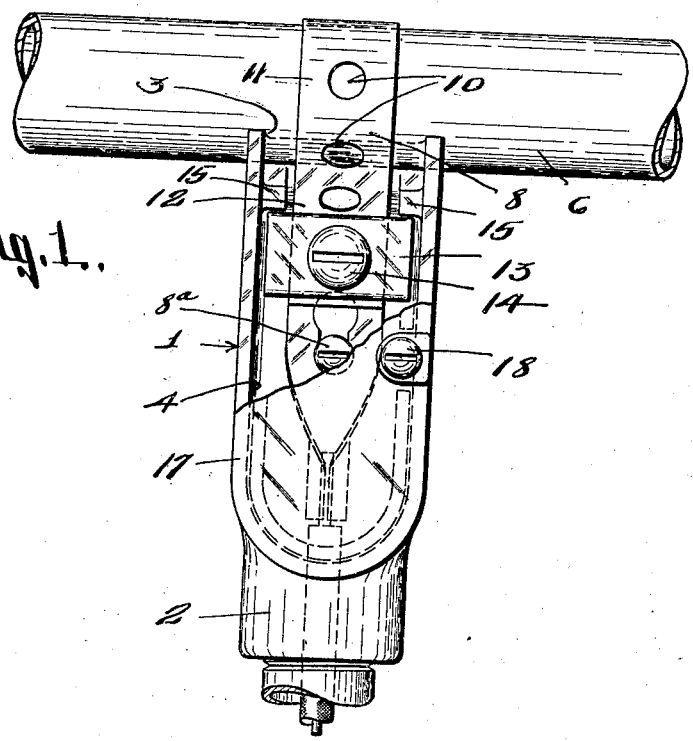
Figure 1 is a plan view of our invention with the cover of the box partly broken away, the contiguous portion of a pipe being also shown.
Figure 2:
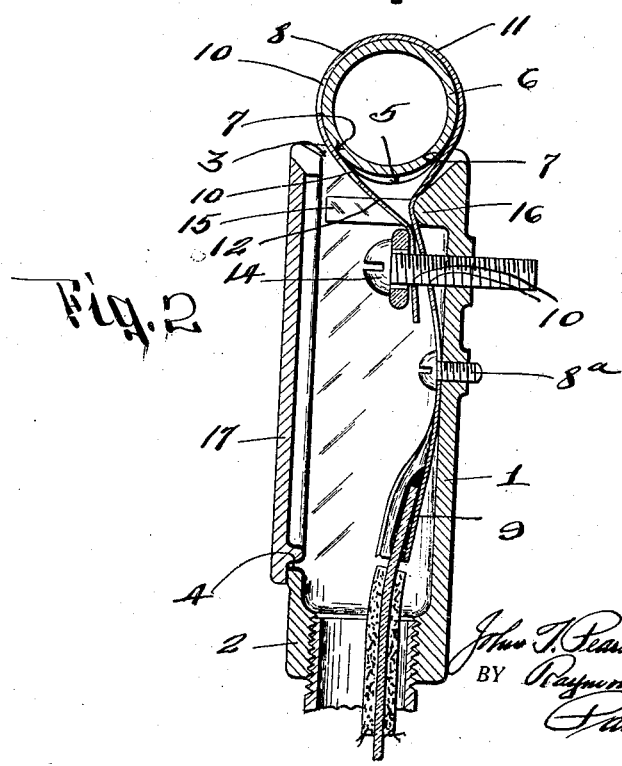
Figure 2 is an elevation, partly broken away taken at a right angle to a Figure 1.

As will be understood by those skilled in the art, the electric conduit system and wires therein are usually grounded to a water pipe or some other convenient pipe beneath the surface of the earth and in some cases the wire is grounded at a point remote from the grounding device to the conduit coupled to the grounding device instead of extending through the conduit and connected by a binding device directly to the grounding device, and this grounding device is applicable to both instances. The device here illustrated is in the form of a conduit outlet box having means as a looped strap, at one end for connection to the grounded conductor, and means at its other end for connection to a conductor or conduit. It usually also has a terminal for connection to the wire enclosed by the conduit, if a wire is used. It comprises a conduit outlet box having an opening at one end, a seat at such end for the pipe to which the ground wire is to be connected and a conductor extending through the open end of the conduit and having one end fixed within the box and its other end returned back through the open end forming a loop for clamping the pipe and means within the box for contracting the loop on the pipe.

1 designates the box or a body of the grounding device, which may be of any suitable form, size and construction, it being here shown as having a nipple 2 at one end for connection to the conduit enclosing the service wires or the ground wire if a ground wire is used.

The body is provided with means at one end for thrusting against the grounded conductor and the loop of the strap has its end portions extending one above the other, and lapping the body. The loop is firmly secured to the body by a clamping screw extending through end portions of the loop, and threading in the body, and means is provided for holding the screw in alignment or holding it from lateral movement during the tightening thereof under the influence of the lateral pull applied thereto by the end portions of the strap. Also the body is provided with additional means as a shoulder located between the screw and the end of the body, and over which one end of the loop extends to tuck or cause the loop to extend and engage the grounded conductor farther around the grounded conductor than it otherwise would. In other words the shoulder acts to change the direction of tangency of such end of the strap from a line at a right angle to the screw into a line at an acute angle to the screw.

The box or body is here shown as provided with an opening 3 at one end and also as open at its top side at 4, these openings communicating at the top corner of the box. The end of the box provided with the opening 3 is formed with seats 5 for a pipe 6, these seats being on the end edges of the side walls of the box and being concave or arc shaped, and of such curvature that regardless of the variations in the size of the pipes good grounding contact will be made at at least two points as at 7.

The conductor is here shown as a tape or strap 8 secured at one end by a screw 8a to the bottom of the box, the screw being accessible through the open side 4 of the box. The tape or strap is usually provided with a terminal 9 at its inner end for securing it to the ground wire. The tape is formed at intervals with holes 10. The tape is similar to the usual pipe hanger tape.

The tape or strap 8 extends through the opening 3 at one end of the box and is returned back through such open end into the box forming a loop 11 for enclosing the pipe 6, the return end of the loop being located in the box.

The means for tightening the loop and holding the screw in alignment or from lateral movement coacts with this return end 12 of the tape 8 and comprises a clamping member as a block 13 movable toward the bottom of the box against the return end 12 of the loop and a screw 14 extending through the block and through one of the holes 10 in the tape, also through one of the holes in the lower run of the tape and threading into the bottom of the box. The block 13 coacts with guides as inwardly projecting ribs 15 on the interior of the box so that as the screw is tightened the block is moved vertically toward the bottom of the box and wraps the upper run of the tape around the pipe and clamps the loop of the tape onto the pipe.

In order to provide as large a contact as possible between the pipe and the tape, means is provided for tucking the tape under the pipe, this means being here shown as an inwardly projecting inclined shoulder 16 at the bottom of the box and at one side of the opening 3, the lower run of the tape extending over this shoulder so that the shoulder, which is arranged to extend under the pipe must so contract the opening 3 that the lower run of the tape is tucked under the pipe.

The shoulder is located between the screw and the end of the body abutting against the pipe and extends inwardly or upwardly toward a plane containing the axis of the grounded pipe, and at a right angle to the screw, so that the strap is caused to wrap around the pipe a greater distance owing to the fact that the ends of the strap extends in a plane tangent to the pipe and at an acute angle to the screw, instead of a plane tangent to the pipe and approaching the right angle to the screw.

A cover 17 is provided for closing the opening 4 of the box, this cover being held in position by a screw 18 or any other suitable means.

In operation the tape is secured to the bottom of the box by the screw 8 and pulled through the open end of the box 3 over the shoulder 16 and then moved back into the box around the pipe. The tape is tightened as much as possible by pulling it around the pipe 6 and then the clamping member placed in position against the guides 15. The screw 14 is then placed through the opening in the clamping member and through one of the holes 10 in the upper run of the tape and through another hole 10 in the bottom run of the tape and the screw then threaded into the opening in the bottom of the box. At the start the block 13 is at the top or upper ends of the guides 15. As the screw 14 is tightened, the block movable straight down toward the bottom of the box thus tightening the loop, the tightening being facilitated by the tucking under the shoulder 16. The excess length of the tape is then cut off and the cover 17 secured to the box.

What we claim is:—

1. A grounding device comprising a body, a conductor at one end of the body in the form of a strap looped to encircle a grounded conductor, the body having means abutting against the grounded conductor, the end portions of the strap extending one over the other and lapping the body, a clamping screw extending through the end portions of the strap and threading into the body, and means thrusting laterally against the screw at a point spaced apart from where the screw threads into the body for holding the screw from lateral movement during the tightening of the screw and the contracting of the loop around the grounded conductor, the body having means for mechanical and electrical connection to another conductor to be grounded through the body.

2. A grounding device comprising a body, a conductor at one end of the body in the form of a strap looped to encircle a grounded conductor, the body having means abutting against the grounded conductor, the end portions of the strap extending one above the other and lapping the body, means for tightening the strap including a clamping screw extending through the end portions of the strap and threading into the body, means acting on the head end of the screw to hold the screw from lateral movement during the tightening thereof including a rigid guide formed on the body and means on the screw coacting with the guide, and the body having means for mechanical and electrical connection to another conductor to be grounded through the body.

3. A grounding device comprising a body, a conductor at one end of the body in the form of a strap looped to encircle a grounded conductor, the body having means abutting against the grounded conductor, the end portions of the strap extending one above the other and lapping the body, a clamping screw extending into the end portions of the strap and threading into the body, a clamping block on the screw underlying the head thereof and pressing against one end portion of the looped conductor, the body being formed with a guide extending in the general direction of the screw, the block being slidable along the guide during the tightening of the screw, the body also having means for connection to another conductor to be grounded through the body.

4. A grounding device comprising a body, a conductor at one end of the body in the form of a strap looped to encircle a grounded conductor, the body having means abutting against the grounded conductor, the end portions of the strap extending one over the other, and lapping the body, a clamping screw extending through the end portions of the strap and threading into the body, and means thrusting laterally against the screw at a point spaced apart from where the screw threads into the body for holding the screw from lateral movement during the tightening of the screw and the contracting of the loop around the grounded conductor, the body having means for connection to another conductor to be grounded through the body and the body also having a shoulder projecting from the part thereof into which the screw threads and toward the head of the screw, the shoulder being located between the screw and the loop, and one end portion of the looped conductor extending over said shoulder.

5. A grounding device comprising a body having means at one end for abutting against a grounded conductor, a conductor at said end of the body in the form of a strap looped to encircle the grounded conductor and clamp the conductor against the end of the body, the end portions of the strap extending one above the other and lapping the body, a clamping screw extending through the end portions of the strap and threading into the body, a threaded bore therefor, a clamping block on the screw underlying the head thereof and pressing against one end portion of the looped conductor, the body having means cooperating with said clamping block for holding the screw in alinement with its cooperating bore during the tightening thereof, said means being located apart from where the screw threads into the body and the body also having means for connection to another conductor to be grounded, said holding means being located to coact with the screw at a point spaced apart from where the screw threads into the body.

6. A grounding device comprising a body, having means at one end for abutting against a grounded conductor, a conductor at said end of the body in the form of a strap looped to encircle the grounded conductor to draw the body against the grounded conductor, the end portions of the strap extending one over the other, and lapping the body, a clamping screw extending through the end portions of the strap, and threading into the body, and means thrusting laterally against the screw at a point spaced apart from where the screw threads into the body for holding the screw from lateral movement during the tightening of the screw and the contracting of the loop around the grounded conductor, the body having means for connection to another conductor to be grounded and also having a shoulder projecting from the part thereof into which the screw threads and toward the head of the screw, the shoulder being located between the screw and the loop, and one end of the looped conductor extending over said shoulder, said shoulder being located between the screw and the means on the body thrusting against the grounded conductor.

7. A grounding device comprising a body, a conductor at one end of the body in the form of a strap looped to encircle a grounded conductor, the body having means abutting against the grounded conductor, the end portions of the strap extending one over the other and lapping the body, a clamping screw extending through the end portions of the strap and the body and means coacting between the end of the screw and side portions of the body for holding the screw from lateral movement during the tightening of the screw and the contracting of the loop around the grounded conductor, the body having means for mechanical and electrical connection to another conductor to be grounded through the body.

8. A grounding device comprising a body, a conductor at one end of the body in the form of a strap looped to encircle a grounded conductor, the body having means abutting against the grounded conductor, the end portions of the strap extending one above the other and overlapping the body, a clamping screw extending into the end portions of the strap and the body, a clamping block on the end of the screw and pressing against one end portion of the looped conductor and means on the block and the body for guiding the block in a path parallel to the axis of the screw as the screw is tightened; the body also having means for connection to another conductor to be grounded through the body.

9. A grounding device comprising a body, a conductor at one end of the body in the form of a strap looped to encircle a grounded conductor, the body having means abutting against the conductor, the end portions of the strap extending one over the other and lapping the body, means interlocking with the end portions of the strap for contracting the looped portion about the conductor comprising a clamping plate pressing on the free end portion of the strap, screw means extending through the plate and threading into the body, means on the body coacting with the plate for guiding the plate in its movement during the clamping operation and thereby holding the screw means from lateral movement during the tightening thereof.

In testimony whereof, we have hereunto set our names, at Syracuse, in the county of Onondaga, and State of New York, this 16th day of February, 1926.

JOHN T. PEARSON.
RAYMOND H. OLLEY.

CERTIFICATE OF CORRECTION.

Patent No. 1,839,254.             Granted January 5, 1932, to

JOHN T. PEARSON ET AL.

It is hereby certified that error appears in the printed specification of the above numbered patent requiring correction as follows: Page 3, lines 53 to 56, strike out comma and words ", said holding means being located to coact with the screw at a point spaced apart from where the screw threads into the body; and that the said Letters Patent should be read with this correction therein that the same may conform to the record of the case in the Patent Office.

Signed and sealed this 16th day of February, A. D. 1932.

(Seal)                                                        M. J. Moore,
                                                           Acting Commissioner of Patents.